J. H. MUMMA.
Straw Cutter.
No. 808.
Reissued Sept. 6, 1859.
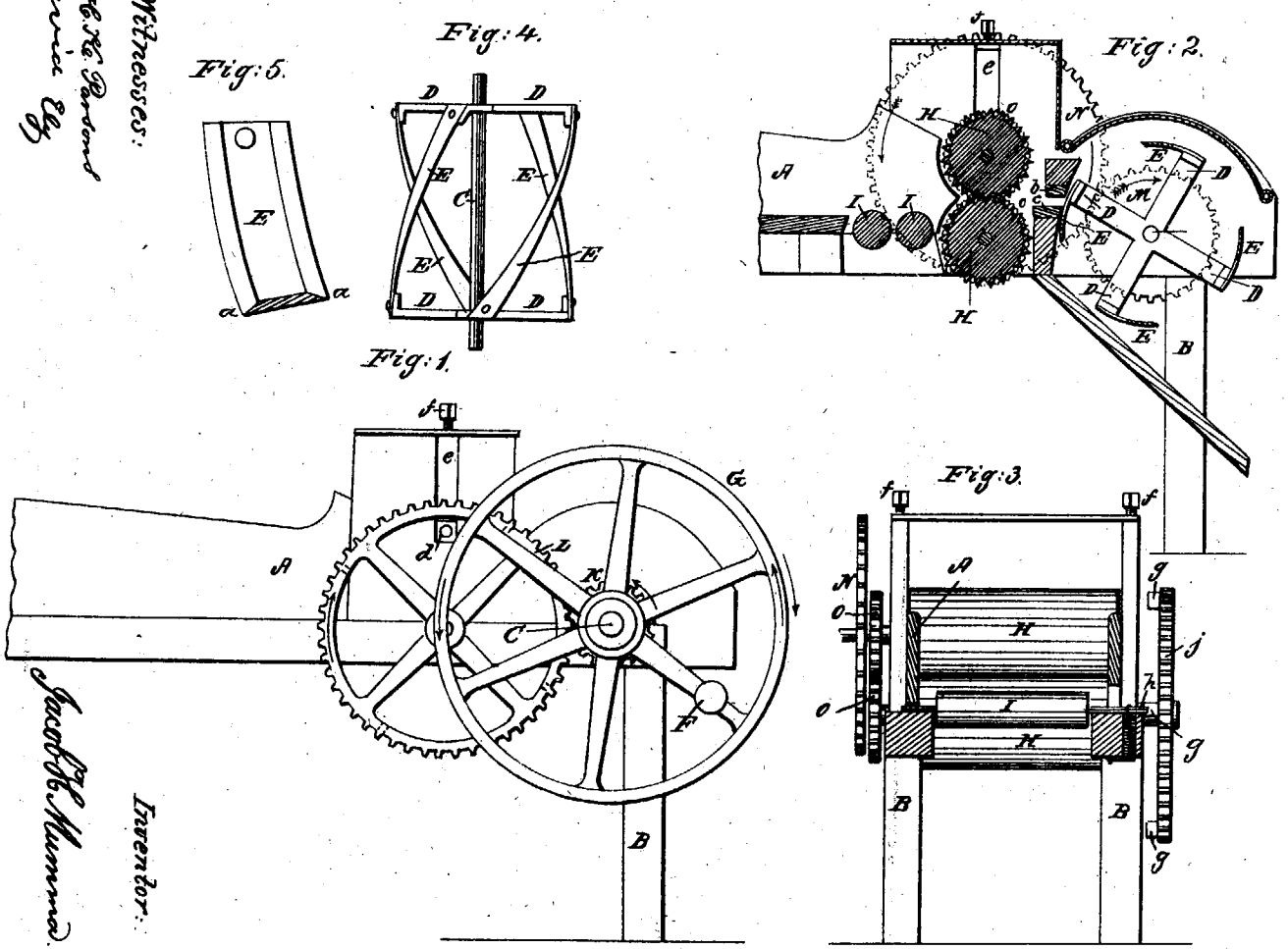
Witnesses:
H. K. Parsons
David Ely
Inventor:
Jacob H. Mumma.
N. PETERS, Photo-Lithographer, Washington, D. C.

UNITED STATES PATENT OFFICE.

JACOB H. MUMMA, OF HARRISBURG, PENNSYLVANIA.

IMPROVEMENT IN STRAW-CUTTERS.

Specification forming part of Letters Patent No. 19,200, dated January 26, 1858; Reissue No. 808, dated September 6, 1859.

*To all whom it may concern:*

Be it known that I, JACOB H. MUMMA, of Harrisburg, in the county of Dauphin and State of Pennsylvania, have invented certain new and useful Improvements in Straw Cutters; and I do hereby declare the following to be a full, clear, and exact description of the same, reference being had to the accompanying drawings, making a part of this specification, in which—

Figure 1 represents a view from one side of the machine. Fig. 2 represents a vertical section through the machine. Fig. 3 represents a vertical transverse section taken behind the feed-rollers, and Figs. 4 and 5 represent more particularly the form of cutter and the arrangement of them on the cutting cylinder or heads.

Similar letters of reference where they occur in the separate figures denote like parts of the machine in all of them.

My invention consists, first, in the application to straw-cutting machines of changeable feed-gear, in combination with the double or two-edged revolving cutters, so made and arranged as that, by reversing the blades or knives end for end on their arms, heads, or supports a new cutting-edge will be brought into action, and the rotation of the knives in either direction make a feed-motion in but one and the same direction; and my invention further consists in the general arrangement of the several parts that feed up the material that is to be cut to the cutting cylinder, as will be explained.

To enable those skilled in the art to make and use my invention, I will proceed to describe the same with reference to the drawings.

A represents the straw-box, arranged on supports B. C is a shaft, upon which are fixed the heads or arms D, to which the knives E are affixed, and this shaft C revolves in suitable bearing on the frame of the machine, and may be turned by the handle F on the fly-wheel G. The knives or cutters E are of a spiral form, and have both of their edges ground down to a cutting-edge, as shown at *a a* in Fig. 5. The object of this is that each knife may have two cutting-edges on it, so that when one becomes dulled the knife may be detached and turned end for end on the arms D, and thus bring a new or fresh cutting-edge into action. By the use of such knives, too, the cylinder may be made to cut either up or down by a very slight change of the gearing, so as to continue the feed in the proper direction; and by also changing the throat-pieces *b c*, against which the cutters act, to allow the straw to project beyond them; but the great desideratum is the availability of a fresh and sharp cutting-edge by simply changing the cutter end for end.

H H are a pair of crushing-rolls, between which the material passes before it reaches the cutters. These rolls are geared together by star gear-wheels *o o*, so that one—the upper one—may yield and move from and to the other without getting out of gear with the other. The boxes or bearings *d* of the elastic roll are held down by rubber springs *e*, and the resistance of these springs is adjusted by set-screws *f*. I find the india-rubber springs far preferable to metal springs, they being not only cheaper and less liable to injury, but actually better than metal springs.

I I′ are feed-rolls, the one, I, being held down by a spring, *i*, so that it may receive a sudden jar or motion for the purpose of shaking all the dirt and grit out of the straw. This roll I is acted on as follows: On the wheel J there are tappets *g*, Fig. 3, which catch under the journal *h* of said roll and raise it up against the action of the spring *i*, and when the tappets slip off from the journal said spring suddenly brings the roller back to its place, which shakes the straw and cleans it of all grit, which would otherwise dull the knives. The roll I′ turns in fixed bearings.

K L are gear-wheels for communicating moton from the fly-wheel shaft to the feeding and crushing cylinders I I′ and H H, and, though the latter are called "crushing-cylinders," yet they act as feeding-rollers too. The feed-rools I I′ are not driven by a positive motion, but may be so driven. They turn simply by the friction of the passing straw or stalks that are being drawn through.

It is immaterial which one of the rolls receives the jar or shake, or which one of the crushing-rolls is held by the gum springs. The effect will be the same in each plan.

M N are the gears that are used when the knives cut upward. The reversing of the knives alone doubles the working capacity of the machine without regrinding the knives. The red arrows in Fig. 1 show the arrangement for cutting down, and the blue arrows in Fig. 2 for cutting up, ward.

Having thus fully described the nature and object of my invention, what I claim therein as new, and desire to secure by Letters Patent, is—

1. The combined application to straw-cutting machines of a changeable feed-gear with two-edged revolving cutters or blades when so made as that by changing them end for end on their arms or supports they shall bring a different cutting-edge into action, or when run in either direction shall always feed in the material in one and the same direction, substantially as and for the purpose stated.

2. The combination of the feed-rollers acted upon by tappets, and the crushing-rollers controlled by gum-elastic springs, when arranged in relation to and acting in connection with the cutting apparatus, as herein described and represented.

JACOB H. MUMMA.

Witnesses:
H. K. PARSONS,
DAVID ELY.